(12) United States Patent
McKean et al.

(10) Patent No.: US 9,836,223 B2
(45) Date of Patent: Dec. 5, 2017

(54) CHANGING STORAGE VOLUME OWNERSHIP USING CACHE MEMORY

(71) Applicant: NetApp, Inc., Sunnyvale, CA (US)

(72) Inventors: Brian D. McKean, Boulder, CO (US); Donald R. Humlicek, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 1 day.

(21) Appl. No.: 15/142,691

(22) Filed: Apr. 29, 2016

(65) Prior Publication Data

US 2017/0315725 A1 Nov. 2, 2017

(51) Int. Cl.
*G06F 12/08* (2016.01)
*G06F 3/06* (2006.01)
*G06F 12/0842* (2016.01)

(52) U.S. Cl.
CPC .............. *G06F 3/061* (2013.01); *G06F 3/065* (2013.01); *G06F 3/0659* (2013.01); *G06F 3/0683* (2013.01); *G06F 12/0842* (2013.01); G06F 2212/1024 (2013.01); G06F 2212/261 (2013.01); G06F 2212/305 (2013.01); G06F 2212/466 (2013.01)

(58) Field of Classification Search
CPC ...... G06F 3/0604; G06F 3/061; G06F 3/0643; G06F 3/065; G06F 3/0659; G06F 3/0667; G06F 3/0683; G06F 12/0842; G06F 2212/1024; G06F 2212/261; G06F 2212/305; G06F 2212/466
USPC .......................................... 711/120, 162, 165
See application file for complete search history.

(56) References Cited

U.S. PATENT DOCUMENTS

| 2008/0162590 | A1* | 7/2008 | Kundu | ................ G06F 11/1471 |
| 2010/0306488 | A1* | 12/2010 | Stroberger | .......... G06F 11/2064 711/162 |
| 2015/0312337 | A1* | 10/2015 | Keremane | .......... H04L 67/1095 709/217 |

* cited by examiner

*Primary Examiner* — Gary Portka
(74) *Attorney, Agent, or Firm* — Haynes and Boone, LLP

(57) ABSTRACT

A method, a computing device, and a non-transitory machine-readable medium for changing ownership of a storage volume from a first controller to a second controller without flushing data, is provided. In the system, the first controller is associated with a first DRAM cache comprising a primary partition that stores data associated with the first controller and a mirror partition that stores data associated with the second controller. The second controller in the system is associated with a second DRAM cache comprising a primary partition that stores data associated with the second controller and the mirror partition associated with the first controller. Further, the mirror partition in the second DRAM cache stores a copy of a data in the primary partition of the first DRAM cache and the mirror partition in the first DRAM cache stores a copy of a data in the primary partition of the second DRAM cache.

20 Claims, 13 Drawing Sheets

CHANGING STORAGE VOLUME OWNERSHIP USING CACHE MEMORY

TECHNICAL FIELD

The description relates to a data storage architecture, and more specifically, to transferring ownership of a volume in the data storage architecture.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput.

At least to reduce latency and increase throughput, many data storage systems use two or more storage controllers or simply controllers in an "active-active" configuration. The "active-active" configuration allows multiple controllers to access data in the data storage system at the same time. Conventionally, these data storage systems have access restrictions, which, for example, allow each controller access to data in only a particular volume or logic unit (LUN). As each controller processes read and write requests for the LUN associated with that controller, each controller stores data from these read and write requests in a memory cache assigned to the storage controller. Periodically, the data in the assigned memory cache is flushed to another storage drive for long term storage, which is a time consuming process. Because the flushing occurs occasionally, data in the memory cache of each controller becomes large and cannot be quickly and efficiently transferred to another storage device as needed.

There may be instances in the data storage system where there data storage system changes ownership of the logic unit from a first controller to a second controller. Conventionally, when the change of ownership occurs, the first controller performs a flush operation which flushes the data from its memory cache to a storage drive before the second controller can operate on the logic unit. However, when the size of the data is large, the flush operation may take a long time. Additionally, during the flush operation, the data storage system typically either stops or slows down the I/O operations between the first controller, the second controller, and the host applications. As a result, the flush operation during an ownership change of a logic unit interferes with the access of the host applications to data stored in the data storage system.

BRIEF DESCRIPTION OF THE DRAWINGS

The disclosure is best understood from the following detailed description when read with the accompanying figures.

DETAILED DESCRIPTION

Figure 1:
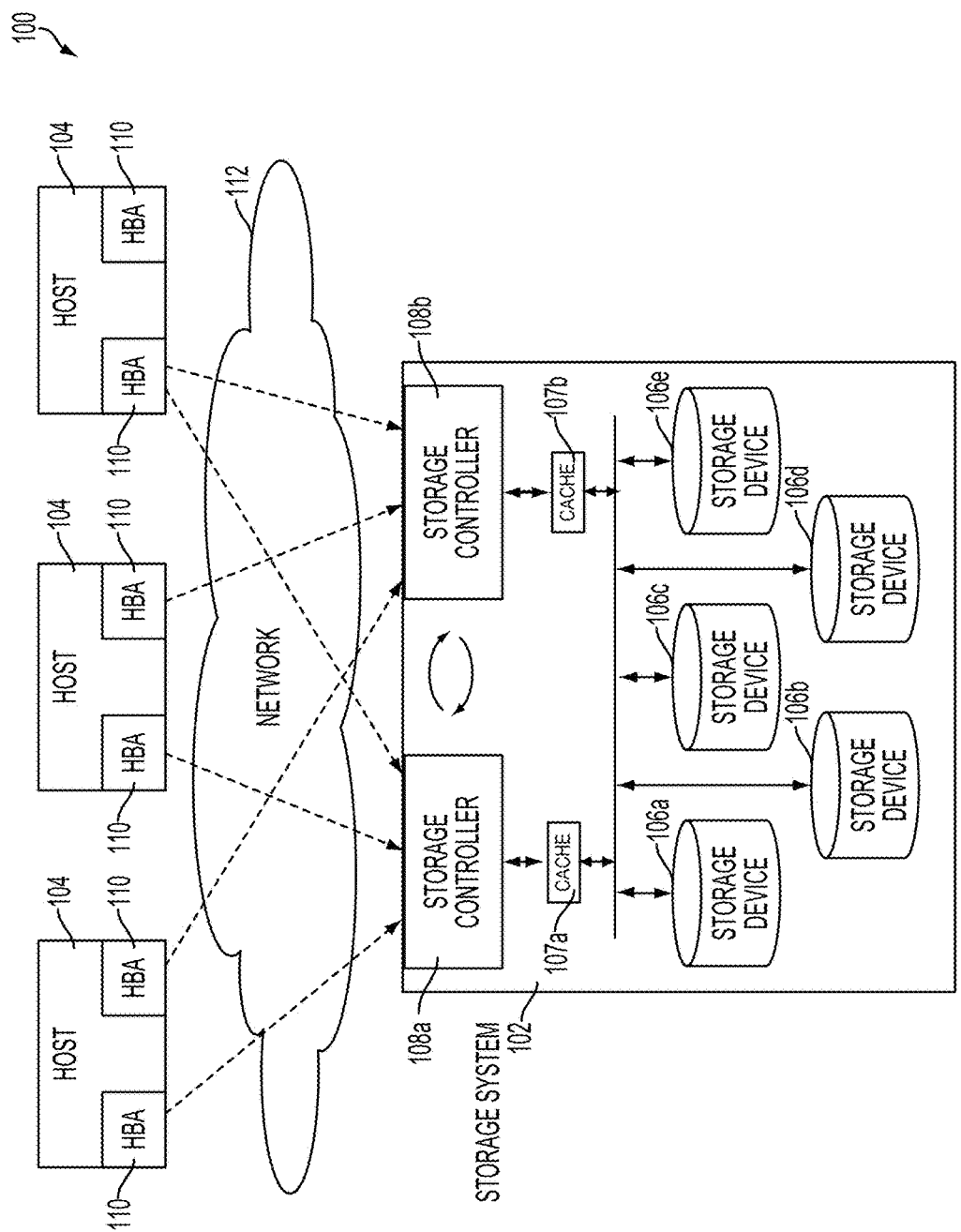
FIG. 1 is a block diagram of data storage architecture, according to an embodiment.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments unless otherwise noted. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for changing ownership of a storage volume (also referred to as a logic unit (LUN)) from a first controller to a second controller without flushing data from a memory cache, such as a DRAM cache or an SSD to the storage drive, such as a hard disk drive or solid state drive, before the change of ownership is complete. In the system, the first controller is associated with a first DRAM cache comprising a primary partition that stores data associated with the first controller and a mirror partition that stores data associated with the second controller. The second controller in the system is associated with a second DRAM cache comprising a primary partition that stores data associated with the second controller and a mirror partition associated with the first controller. Further, the mirror partition in the second DRAM cache stores a copy of a data in the primary partition of the first DRAM cache and the mirror partition in the first DRAM cache stores a copy of a data in the primary partition of the second DRAM cache.

When the second controller receives an indication of an ownership change for a LUN, the second controller scans the mirror partition in the second DRAM cache that stores a copy of recovery metadata associated with the LUN that was generated by the first controller. The first controller generated the recovery metadata associated with the LUN when processing an input/output (I/O) request (such as a read or write request) prior to the change in ownership of the LUN to the second controller. The second controller uses the recovery metadata to generate an active metadata for the LUN, and then uses the active metadata to access dirty data in the mirror partition of the first controller to process an I/O request associated with the LUN without first flushing the dirty data to the storage drive.

FIG. 1 is a block diagram of a data storage architecture 100 according to an embodiment. The data storage architecture 100 includes a storage system 102 that processes data transactions on behalf of other computing systems implemented in one or more hosts 104. The storage system 102 is only one example of a computing system that may perform data storage and indirection (i.e., virtualization). It is understood that the present technique may be performed by any computing system (e.g., a host 104 or third-party system) operable to read and/or write data from any suitable storage device 106. For instance, in some embodiments one or more storage controllers 108 perform the techniques described herein, including those described with respect to the flowcharts of FIGS. 3A-B and 5A-B.

The exemplary storage system 102 receives data transactions (e.g., requests to read and/or write data) from the hosts 104 and takes an action such as reading, writing, or otherwise accessing the requested data so that the storage devices 106, such as storage devices 106a-e of the storage system 102 appear to be directly connected (local) to the hosts 104. This allows an application running on a host 104 to issue transactions directed to the storage devices 106 of the storage system 102 and thereby access data on the storage system 102 as easily as it can access data on the storage devices of the host 104. Although for illustrative purposes a single storage system 102 communicating with multiple hosts 104 is shown, a storage system 102 may include any number of computing devices and may range from a single computing system to a system cluster of any size and may communicate with one or more hosts 104.

In an embodiment, each storage system 102 and host 104 includes at least one computing system, which in turn may include a processor operable to perform various computing instructions, such as a microcontroller, a central processing unit (CPU), or any other computer processing device. The computing system may also include a memory device such as random access memory (RAM); a non-transitory machine-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

With respect to the hosts 104, a host 104 includes any computing resource that is operable to exchange data with a storage system 102 by providing (initiating) data transactions to the storage system 102. In an exemplary embodiment, a host 104 includes a host bus adapter (HBA) 110 in communication with a storage controller 108 of the storage system 102. The HBA 110 provides an interface for communicating with the storage controller 108, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire.

In many embodiments, the host HBAs 110 are coupled to the storage system 102 via a network 112, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. To interact with (e.g., read, write, modify, etc.) remote data, the HBA 110 of a host 104 sends one or more data transactions to the storage system 102 via the network 112. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106, such as storage devices 106a-e. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

With respect to the storage system 102, the exemplary storage system 102 contains one or more storage controllers 108, such as storage controllers 108a and 108b that receive the transactions from the host(s) 104 and that perform the data transaction using the storage devices 106. The storage devices 106 of the storage system 102 may include hard disk drives (HDDs), solid state drives (SSDs), RAM drives, optical drives, and/or any other suitable non-volatile data storage medium. The storage controllers 108a and 108b exercise low-level control over the storage devices 106a-e in order to execute (perform) data transactions on behalf of the hosts 104, and in so doing, may group the storage devices for speed and/or redundancy using a virtualization technique such as RAID (Redundant Array of Independent/Inexpensive Disks). At a high level, virtualization includes mapping physical addresses of the storage devices into a virtual address space and presenting the virtual address space to the hosts 104. In this way, the storage system 102 represents a group of devices as a single device, often referred to as a storage volume or a logic unit. Thus, a host 104 can access the logic unit without concern for how it is distributed among the underlying storage devices 106.

Storage controllers 108a and 108b may also be in communication with caches 107, such as cache 107a and 107b. Caches 107 are configured to cache data on behalf of the storage devices 106. Typically, faster devices are used in higher tiers of a memory structure, and accordingly in one embodiment, the storage devices 106 include a plurality of HDDs arranged in a Redundant Array of Independent Disks (RAID) configuration, whereas the caches 107 include a plurality of solid state drives (SSDs) and/or random-access memory configured as a RAM disk, dynamic random access memory (DRAM), etc. Of course, these configurations are merely exemplary, and the storage devices 106 and the caches 107 may each include any suitable storage device or devices in keeping with the scope and spirit of the disclosure.

Continuing with the embodiment, each one of storage controllers 108 in FIG. 1 may be associated with a corresponding cache from caches 107. For example, storage controller 108a is associated with cache 107a and storage controller 108b is associated with cache 107b. Further, cache 107a may be a physical piece of hardware that is located within or communicatively coupled to storage controller 108a, while cache 107b may be a physical piece of hardware that is located within or communicatively coupled to storage controller 108b. In this way, storage controller 108a uses cache 107a to cache data in a storage volume and eventually flush the data to storage devices 106a-e. Similarly, storage controller 108b uses cache 107b to cache data in another storage volume and eventually flush the data to storage devices 106a-e.

In an active-active system, storage controllers 108a and 108b access data in storage devices 106a-e by reading and writing the data. As described above, data in storage devices 106a-e may be split into multiple volumes or logic units, according to an appropriate storage technique, such as a Redundant Array of Independent Disks (RAID) level. In an embodiment, a first set of logic units may be assigned to storage controller 108a and a second set of logic units may be assigned to storage controller 108b. The first and second set of logic units may be non-overlapping logic units, though the implementation is not limited to this embodiment. Once assigned, storage controllers 108a and 108b have ownership of the assigned sets of the logic units, and can access and manipulate data in assigned sets of the logic units. When the logic units in the first set of logic units and the second set of logic units do not overlap, storage controller 108a accesses data in the first set of logic units, while the second storage controller 108b accesses data in the second set of logic units. In this way, storage controllers 108a and 108b can operate relatively independently from each other, as each storage controller reads and writes to non-overlapping locations in storage devices 106a-e.

In an embodiment, even though storage controller 108a operates on the first set of logic units and storage controller 108b operates on the second set of logic units, storage system 102 may reassign ownership of a storage volume (also referred to as a logic unit) from one controller to another controller, according to the embodiments discussed below. However, because storage controller 108a uses cache 107a, and storage controller 108b uses cache 107b to temporarily cache data for the logic unit, the cached data also needs to be reassigned when the ownership of a logic unit changes. Conventional storage systems would flush the data in the cache to the storage devices during an ownership change of a logic unit. This way, after the ownership change, the newly assigned storage controller can retrieve a clean copy of data from the storage devices. However, because data flushing of a large cache is a time consuming process, the embodiment described herein, transfer ownership of a logic unit without flushing data from the cache to storage devices. In particular, FIGS. 2 and 3A-B describe a change of ownership of a logic unit from one controller to another when data associated with the logic unit is stored in caches 117 that are DRAM caches. And, FIGS. 4, 5A-B, and 6A-F describe a change of ownership of a logic unit from one controller to another controller when data associated with the logic unit is stored in caches 117 that are SSD volumes.

Figure 2:
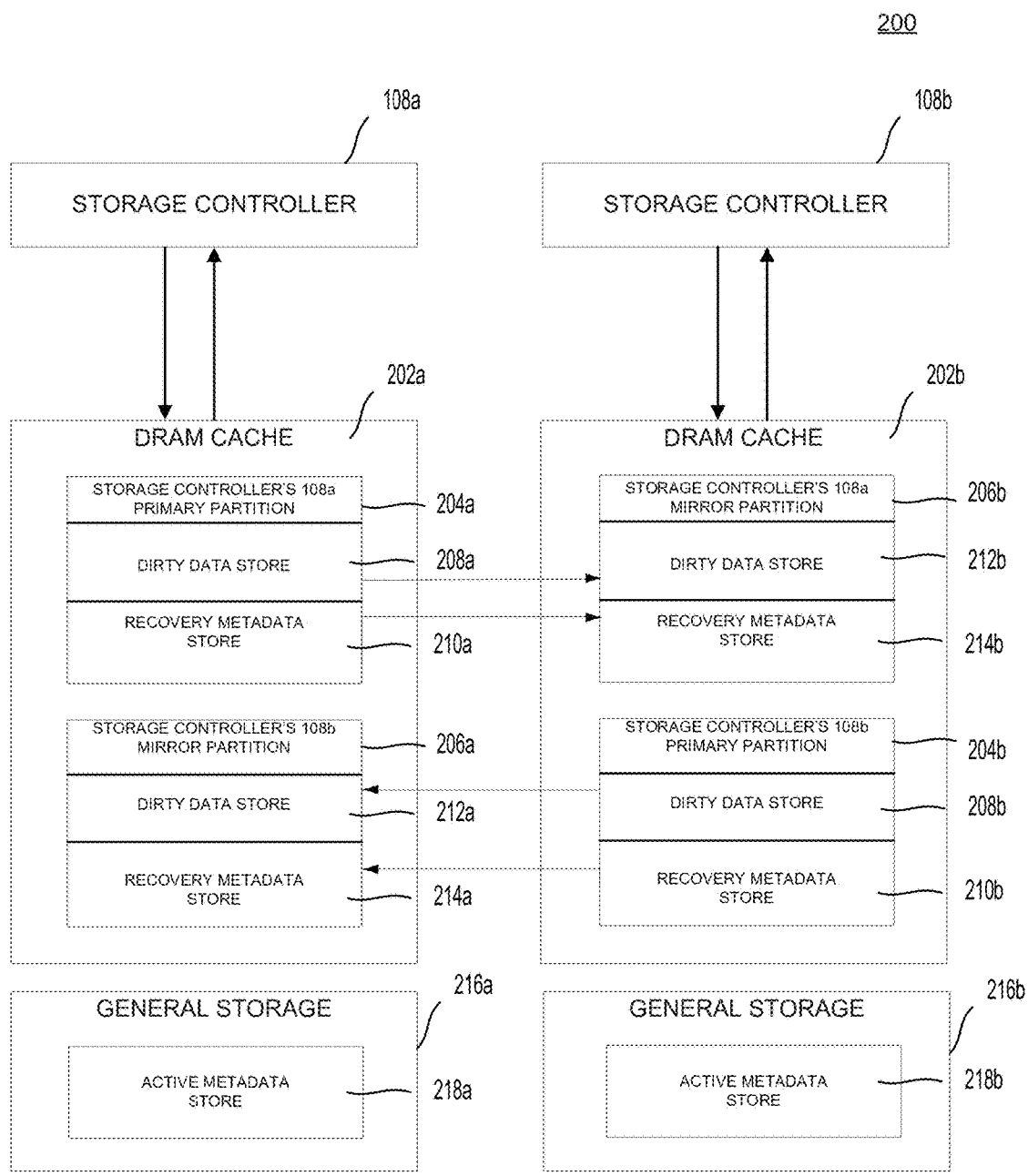
FIG. 2 is a block diagram of two storage controllers storing data from multiple logic units in a dynamic random access memory cache (DRAM), according to an embodiment.

FIG. 2 is a block diagram 200 of two storage controllers storing data from multiple logic units in a dynamic random access memory cache (DRAM), according to an embodiment. FIG. 2 illustrates storage controllers 108a and 108b described in FIG. 1. Storage controllers 108a and 108b access data for a particular logic unit or LUN. In an embodiment, storage controller 108a is assigned a unique set of LUNs for I/O caching. This way, storage controller 108a accesses data for a first set of LUNs and storage controller 108b accesses data for a second set of LUNs. Further, the LUNs in the first set of LUNs may not overlap with the LUNs in the second set of LUNs, according to one embodiment. In this way, storage controller 108a processes I/O requests for LUNs that are associated with storage controller 108a, while storage controller 108b processes I/O requests for LUNs that are associated with storage controller 108b. When storage controller 108a receives an I/O request for a LUN associated with storage controller 108b, storage controller 108a may either reject the I/O request or pass the I/O request to storage controller 108b. Similarly, when storage controller 108b receives an I/O request that is associated with a LUN assigned to storage controller 108a, storage controller 108b may either reject the I/O request or pass the I/O request to storage controller 108a.

In an embodiment, storage controller 108a is associated with a dynamic random access memory cache or a DRAM cache 202a, and storage controller 108b is associated with DRAM cache 202b. DRAM cache 202a stores data and metadata manipulated by storage controller 108a and DRAM cache 202b stores data and metadata manipulated by storage controller 108b. In one embodiment, DRAM cache 202a and DRAM cache 202b may be a single DRAM cache that is partitioned into two sections, where the first section is accesses by storage device 108a and is referred to as DRAM cache 202a, and the second section is accessed by storage device 108b and is referred to as DRAM cache 202b. In another embodiment, DRAM cache 202a and DRAM cache 202b may be separate DRAM caches. Typically, storage controllers 108a and 108b temporarily store data in DRAM cache 202a and 202b before the data is flushed to the storage devices 106 for permanent storage.

In an embodiment, DRAM cache 202a may be divided into partitions, such as a primary partition 204a and a mirror partition 206a. Each partition is further divided into one or more memory areas, such as a dirty data store 208a and a recovery metadata store 210a. In an embodiment, the dirty data store 208a may store dirty data associated with a logic unit that is assigned to storage controller 108a. In an embodiment, the dirty data is data that is out of synch with its LUN at storage devices 106 because different write operations acted on the data. Also, the dirty data may be data that is provided to storage controller 108a from host 104 or data that is being manipulated by the storage system 102 before the data is stored to the storage devices 106. In a further embodiment, the dirty data store 208a may be divided into one or more cache blocks, where each cache block is accessible using an LBA, a physical address, or another memory address. Further, the one or more cache blocks may be of equal size and may be measured in bytes. In an embodiment, recovery metadata stores 210a stores recovery metadata that includes information from which storage controller 108a can recover dirty data in an event a power failure, a controller failure or a path failure which would cause dirty data to be erased or corrupted.

In an embodiment, DRAM cache 202b may be divided into partitions, such as a primary partition 204b and a mirror partition 206b. Each partition is further divided into one or more memory areas, such as a dirty data store 208b and a recovery metadata store 210b. In an embodiment, dirty data store 208b may store data associated with a logic unit that is assigned to storage controller 108b. Also, dirty data store 208b may store data that is provided to storage controller 108b from host 104 or data that is being manipulated in the storage system 102 before the data is stored to the storage devices 106. In a further embodiment, the dirty data store 208b may also be divided into one or more cache blocks, where each cache block is accessible using an LBA, a physical address, or another memory address. In an embodiment, the recovery metadata store 210b stores recovery metadata that includes information from which storage controller 108a can recover dirty data in the event a power failure, a controller failure or a path failure which would cause dirty data to be erased or corrupted.

As described above, DRAM cache 202a also includes the mirror partition 206a which is associated with the storage controller 108a, and DRAM cache 202b also includes the mirror partition 206b which is associated with the storage controller 108b. Mirror partition 206a stores a copy of the data stored in primary partition 204b, which is associated with storage controller 108b. For example, mirror partition 206a stores a copy of the dirty data and the recovery metadata stored in primary partition 204b for the LUNs assigned to storage controller 108b. And, mirror partition 206b stores a copy of the dirty data and the recovery metadata stored in the primary partition 204a, which is associated with the storage controller 108a. For example, mirror partition 206b stores a copy of the dirty data and the recovery metadata stored in primary partition 204a for the LUNs assigned to storage controller 108a.

In an embodiment, the mirror partition 206a is divided into a dirty data store 212a and a recovery metadata store 214a, where dirty data store 212a stores a copy of data stored in the dirty data store 208b, and recovery metadata store 214a stores a copy of the recovery metadata stored in the recovery metadata store 210b. Similarly, mirror partition 206b is divided into a dirty data store 212b and a recovery metadata store 214b, where the dirty data store 212b stores a copy of data stored in dirty data store 208a, and recovery metadata stores 214a stores a copy of the recovery metadata stored in recovery metadata store 210a.

In an embodiment, when storage controller 108a receives an I/O request from the host 104 that is associated with a LUN assigned to the storage controller 108a, storage controller 108a writes data from the I/O request in the dirty data store 208a. Storage controller 108a also generates recovery metadata and stores the recovery metadata in the recovery metadata store 210a of the primary partition 204a. Additionally, the storage controller 108a also mirrors a copy of the data in the dirty data store 208a and recovery metadata store 210a into the dirty data store 212b and the recovery metadata store 214b of the storage controller's 108a mirror partition 206b. Similarly, when storage controller 108b receives an I/O request from the host 104 that is associated with a LUN assigned to the storage controller 108b, the storage controller 108b writes data in the dirty data store 208b. Also, storage controller 108b generates recovery metadata and stores the recovery metadata in the recovery metadata store 210b of the primary partition 204b. Additionally, the storage controller 108b also mirrors a copy of the data in the dirty data 208b and recovery metadata store 210b in the dirty data store 212a and the recovery metadata store 214a of the storage controller's 108b mirror partition 206a.

FIG. 2 also illustrates a general storage 216a and general storage 216b. General storage 216a and general storage 216b may be part of a single storage or separate storages. Further general storage 216a and general storage 216b may be a cache storage or permanent storage. In an embodiment, general storage 216a includes an active metadata store 218a which stores active metadata. The active metadata is data necessary for storage controller 108a to manage I/O operations and transactions of data to and from primary partition 204a. Typically, the volume of the active metadata is larger than the volume of the recovery metadata. Also, recovery metadata may be a subset of the active metadata in some embodiments.

In an embodiment, general storage 216b includes active metadata store 218b, which stores active metadata necessary for the storage controller 108b to manage I/O operations and transactions of data to and from primary partition 204b.

In further embodiments, active metadata may be stored in a general storage 216a and 216b, as opposed to the DRAM cache 202a and 202b, because storage system 102 does not back up active metadata to the storage devices 106.

In an embodiment, unlike recovery metadata stores 214a and 214b, storage controllers 108a and 108b do not generate mirror copies of the active metadata.

In an embodiment, storage controller 108a uses DRAM cache 202a and general storage 216a to process I/O requests for a LUN assigned to the storage controller 108a. Although the embodiments below will be described with reference to storage controller 108a, a person of ordinary skill in the art will appreciate that storage controller 108b similarly processes I/O requests for a LUN assigned to the storage controller 108b. For example, when storage controller 108a receives an I/O request from host 104, storage controller 108a allocates cache blocks in the dirty data store 208a of primary partition 204a. Storage controller 108a then transfers data in the I/O request from host 104 and stores the data in the cache blocks as dirty data. Next, storage controller 108a also builds active metadata and recovery metadata for the I/O request and stores the active metadata in active metadata store 218a and recovery metadata in recovery metadata store 210a. Additionally, storage controller 108a also stores a copy of the dirty data in the dirty data store 212b and a copy of the recovery metadata in recovery metadata store 214b of the mirror partition 206b.

In an embodiment, storage system 102 may transfer ownership or re-assign a LUN from storage controller 108a to storage controller 108b. Such transfers of ownership may occur to balance processing of the I/O requests on storage controllers 108a and 108b, to recover from a storage control failure, etc.

During conventional transfers of a LUN, storage controllers 108a and 108b temporarily suspend processing of new I/O requests and allow existing I/O requests to complete. Next, storage controller 108a flushes the dirty data for the LUN that is being re-assigned from the DRAM cache to the storage devices 106, and purges the clean and dirty data from the one or more DRAM caches that store the original or copies of the dirty data for the LUN. Next, storage system 102 re-assigned the ownership of a LUN from storage controller 108a to storage controller 108b, and storage controller 108b begins to process I/O requests from the host 104 for the re-assigned LUN. Storage controller 108a also begins processing the I/O requests for the LUNs that remain assigned to the storage controller 108a. However, while the above process is acceptable for the small DRAM caches, when a DRAM cache is large and stores large amounts of dirty data, the interference with the I/O requests while the storage system 102 re-assigns ownership of the LUN lowers the overall system efficiency and has an effect on the storage system performance.

Another way to re-assign ownership of a LUN from the storage controller 108a to the storage controller 108b is to use the data in DRAM cache 208b and not flush the dirty data to the storage devices 106. Rather, during the transfer of ownership of a LUN, the storage controller obtaining the ownership of the LUN, which in this case is storage controller 108b, uses storage controller's 108a mirror partition to control the dirty data for the LUN. In an embodiment, storage controller 108b scans the recovery metadata for the LUN in the recovery metadata store 214b and creates active metadata from the scanned recovery metadata. Storage controller 108b then stores the created active metadata in active metadata store 218b and tags the active metadata with an indication that the active metadata is associated with the data stored in the dirty data store 212b of the storage controller's 108a mirror partition 206b. Also, in an embodiment, the storage controller 108a losing the ownership of a LUN, which in this case is storage controller 108a, scans the active metadata store 218a and removes the active metadata that is associated with the LUN being transferred.

In an embodiment, when the transfer of ownership of a LUN from storage controller 108a to storage controller 108b completes, the storage controller 108b may be managing active metadata in the active metadata store 218b for the data in the dirty data store 208b in storage controller's 108b primary partition 204b and the data in the dirty data store 212b in the storage controller's 108a mirror partition 206b.

After the transfer of ownership of the LUN completes, storage controller 108b processes the I/O requests the second set of LUNs, including the transferred LUN. In an embodiment, the processing on the I/O request depends on whether the I/O request is a read request or a write request, and the partition, 204b or 206b that stores the dirty data. For example, when host 104 issues a read request, storage controller 108b can service the read request using primary partition 204b or mirror partition 206b, depending on which partition stores the dirty data requested in the I/O request.

In another example, when host 104 issues an I/O request that is a write request, storage controller 108b determines whether the dirty data exists in the dirty data store 208b of storage controller's 108b primary partition 204a or whether the dirty data exists in the dirty data store 212b of the storage controller's 108a mirror partition 206b. If the dirty data does not exist in the mirror partition 206b, storage controller 108b performs the write request using primary partition 204b, as described above.

However, if the dirty data exists in the dirty data store 212b, storage controller 108b manipulates data in the dirty data store 208b and 212b. In an embodiment, storage controller 108b transfers the new data in the I/O request from host 104 to the dirty data store 208b. Next, storage controller 108b generates active metadata and recovery metadata for the data in the I/O request. The generated active metadata is stored in the active metadata store 218b and the generated recovery metadata is stored in the recovery metadata store 210b. Additionally, the dirty data from the host 104 and the generated recovery metadata are also mirrored in the dirty data store 212a and the recovery metadata store 214a of the storage controller's 108b mirror partition 206a. Next, storage controller 108b merges non-overwritten dirty data for the LUN from the dirty data store 212b in the storage controller's 108a mirror partition 206b into the dirty data store 208b. Next, storage controller 108b creates the active metadata and recovery metadata for the transactions in merge and updates the active metadata store 218b and the recovery metadata store 210b. Next, storage controller 108b mirrors the dirty data store 212a with the dirty data in the dirty data store 208b, such that the dirty data from the merge is also stored in the dirty data store 212a. Next, storage controller 108b updates active metadata store 218a and recovery metadata store 214b to indicate that the dirty data for the LUN stored in the dirty data store 212b is no longer in use. Next, storage controller 108b copies the recovery metadata in the recovery metadata store 214b to the recovery metadata store 210a. Next, storage controller 108b deletes the active metadata in the active metadata 218b that is associated with the dirty data in the dirty data store 212b. Finally, storage controller 108b sends a message to storage controller 108a that the cache block(s) in the dirty data store 208a and the dirty data store 212b are free, and that the storage controller 108a can re-use the cache block(s) for another I/O request.

Figure 3A:
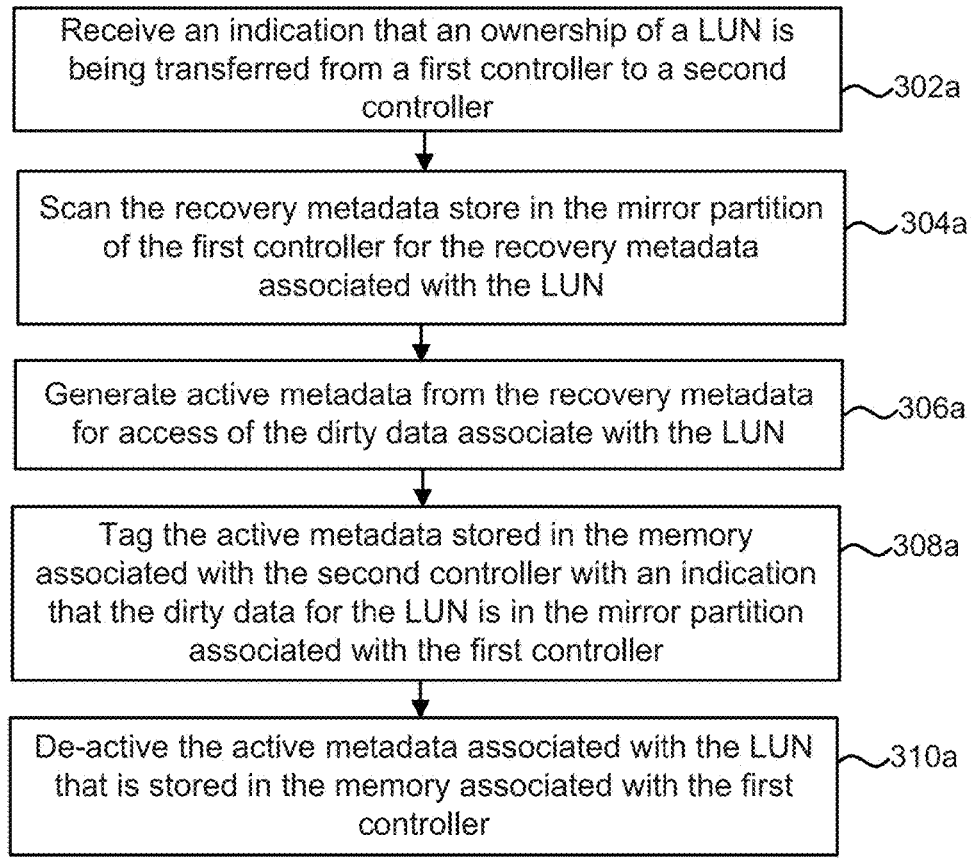
FIG. 3A is a flowchart of a method for transferring ownership of a logic unit from a first controller to a second controller, according to an embodiment.

FIG. 3A is a flowchart of a method 300A for transferring ownership of a LUN from a first controller to a second controller, according to an embodiment. In an embodiment, the first controller is storage controller 108a and the second controller is storage controller 108b. Method 300A may be implemented in hardware, software, or a combination thereof, of the components described in FIGS. 1-2. Prior to the method 300A, the storage controller 108a stores data for the LUNs assigned to the storage controller 108a in the primary partition 204a and the mirror partition 206b. Similarly, the storage controller 108b stores data for the LUNs assigned to the storage controller 108b in the primary partition 204b and the mirror partition 206a.

At operation 302a, an indication is received that the ownership of a LUN is being transferred from a first controller to a second controller. For example, storage controller 108b receives an indication that a LUN associated with storage controller 108a is being transferred to storage controller 108b.

At operation 304a, the recovery metadata store for the recovery metadata associated with the LUN is scanned. For example, storage controller 108b scans the recovery metadata store 214b of storage controller's 108a mirror partition 206b for the recovery metadata that is associated with the LUN. As discussed above, storage controller's 108a mirror partition 206b is located in the DRAM cache 202b that is associated with storage controller 108b.

At operation 306a, active metadata is generated from the scanned recovery metadata. For example, storage controller 108b generates active metadata for the LUN from the recovery metadata obtained from a scan in operation 304.

At operation 308a, the active metadata is tagged with an indication indicating that the dirty data is in the mirror partition. For example, storage controller 108b stores the generated active metadata in the active metadata store 218b and tags the active metadata to indicate that the active metadata is associated with the data stored in the dirty data store 212b of the storage controller's 108a mirror partition 206b.

At operation 310a, the active metadata associated with the first storage controller is deactivated. For example, storage controller 108a de-activates the active metadata in the active metadata store 218a, where the active metadata is associated with LUN being transferred.

Figure 3B:
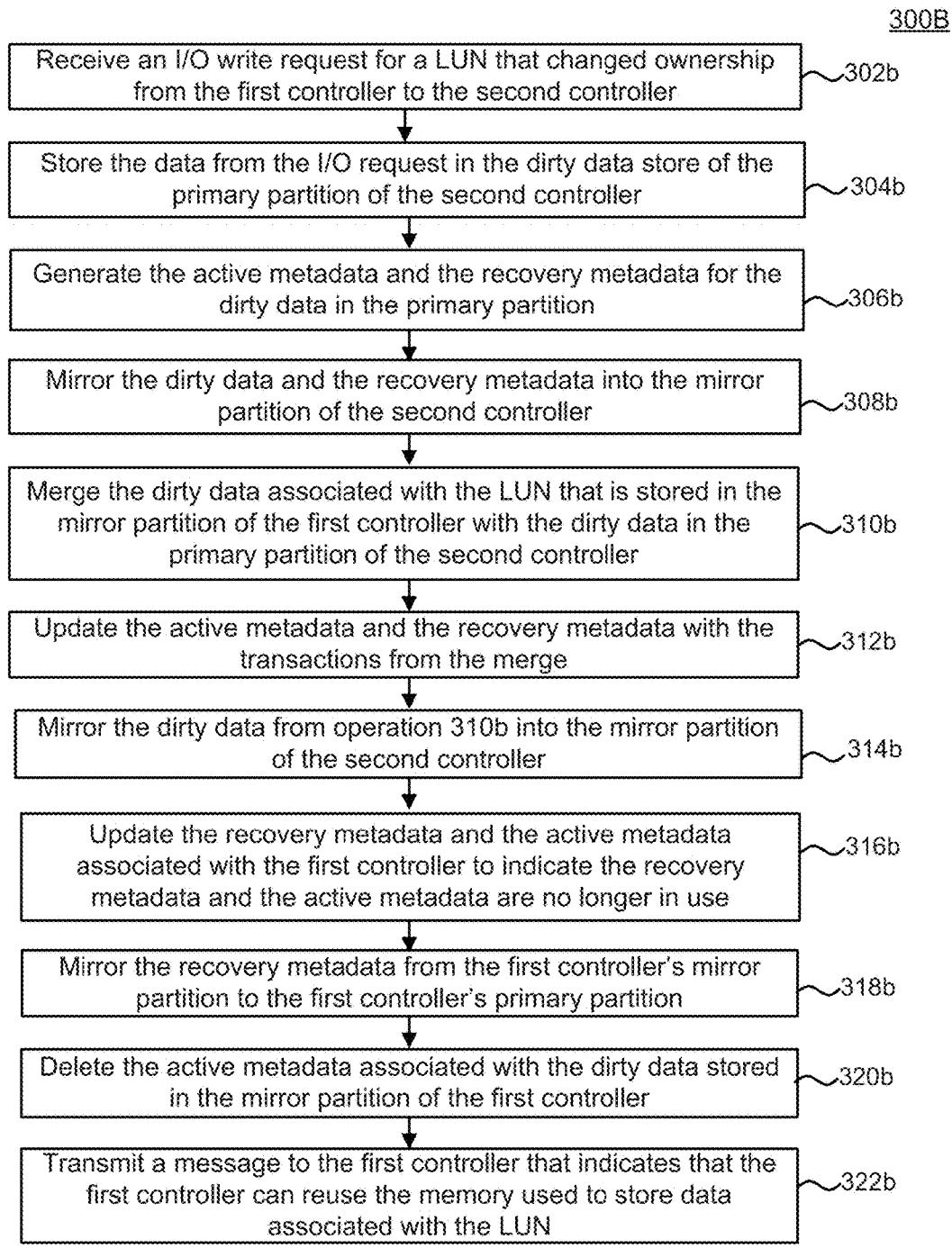
FIG. 3B is a flowchart of a method for processing a write request after the ownership of a logic unit is transferred from a first controller to a second controller, according to an embodiment.

FIG. 3B is a flowchart of a method 300B for processing a write request after the ownership of a LUN is transferred from a first controller to a second controller, according to an embodiment. In method 300, the first controller is the storage controller 108a and the second controller is the storage controller 108b, according to an embodiment. Method 300B may be implemented in hardware, software, or a combination thereof, of the components described in FIGS. 1-2.

At operation 302b, an I/O write request is received. For example, storage controller 108b receives a write request from the host 104. In an embodiment, the I/O write request is for a LUN whose ownership has been re-assigned from the storage controller 108a to the storage controller 108b.

At operation 304b, the data in the I/O write request is stored in the primary partition of a second storage controller. For example, storage controller 108b allocates one or more cache blocks in the dirty data store 208b of the storage controller's 108b primary partition 204b. Storage controller then stores the new data for the I/O request from host 104 in the one or more cache blocks.

At operation 306b, the active metadata and the recovery metadata are generated. For example, storage controller 108b generates active metadata and recovery metadata for data in the I/O request, and stores the active metadata in the active metadata store 218b and the recovery metadata in the recovery metadata store 210b.

At operation 308b, the dirty data and the recovery metadata are copied to the mirror partition. For example, storage controller 108b copies the dirty data obtained in operation 304 from the host 104 and the recovery metadata generated in operation 306 into the dirty data store 212a and recovery metadata store 214a of the storage controller's 108b mirror partition 206a.

At operation 310b, the dirty data for the LUN associated with the first storage controller is merged. For example, storage controller 108b merges non-overwritten dirty data for the LUN from the dirty data store 212b in the storage controller's 108a mirror partition 206b into the dirty data store 208b.

At operation 312b, the active data and the recovery data are updated with the transactions from the merged. For example, storage controller 108b generates the active metadata and recovery metadata for the transactions from the merge, and updates the active metadata store 218b and the recovery metadata store 210b with the generated active metadata and the recovery metadata.

At operation 314b, the dirty data from operation 310 is mirrored in the mirror cache. For example, the storage controller 108b copies the dirty data from the dirty data store 208b into the dirty data store 212a, such that the dirty data from the merge is also stored in the dirty data store 212a.

At operation 316b, the active metadata store and the recovery metadata store associated with the first storage controller are updated to indicate that the active metadata and the recovery metadata are no longer in use. For example, storage controller 108b updates active metadata in the active metadata store 218b and the recovery metadata in the recovery metadata store 214b to indicate that the dirty data for the LUN stored in the dirty data store 212b is no longer in use.

At operation 318b, the recovery data in the first storage controller's mirror partition is mirrored into the recovery metadata store of the first storage controller's primary partition. For example, storage controller 108b mirrors the recovery metadata in the recovery metadata store 214b into the recovery metadata store 210a.

At operation 320b, the active metadata associated with the dirty data stored in the mirror partition of the first storage controller is deleted. For example, the storage controller 108b deletes the active metadata in the active metadata 218b that is associated with the dirty data in the dirty data store 212b.

At operation 322b, a message is transmitted to the first storage controller indicating that the first storage controller is able to re-use the cache blocks in its primary and mirror partitions. For example, storage controller 108b sends a message to storage controller 108a that the cache block(s) in the dirty data store 208a and the dirty data store 212b are free, and that the storage controller 108a can re-use the cache block(s) for an I/O request associated with another LUN.

Figure 4:
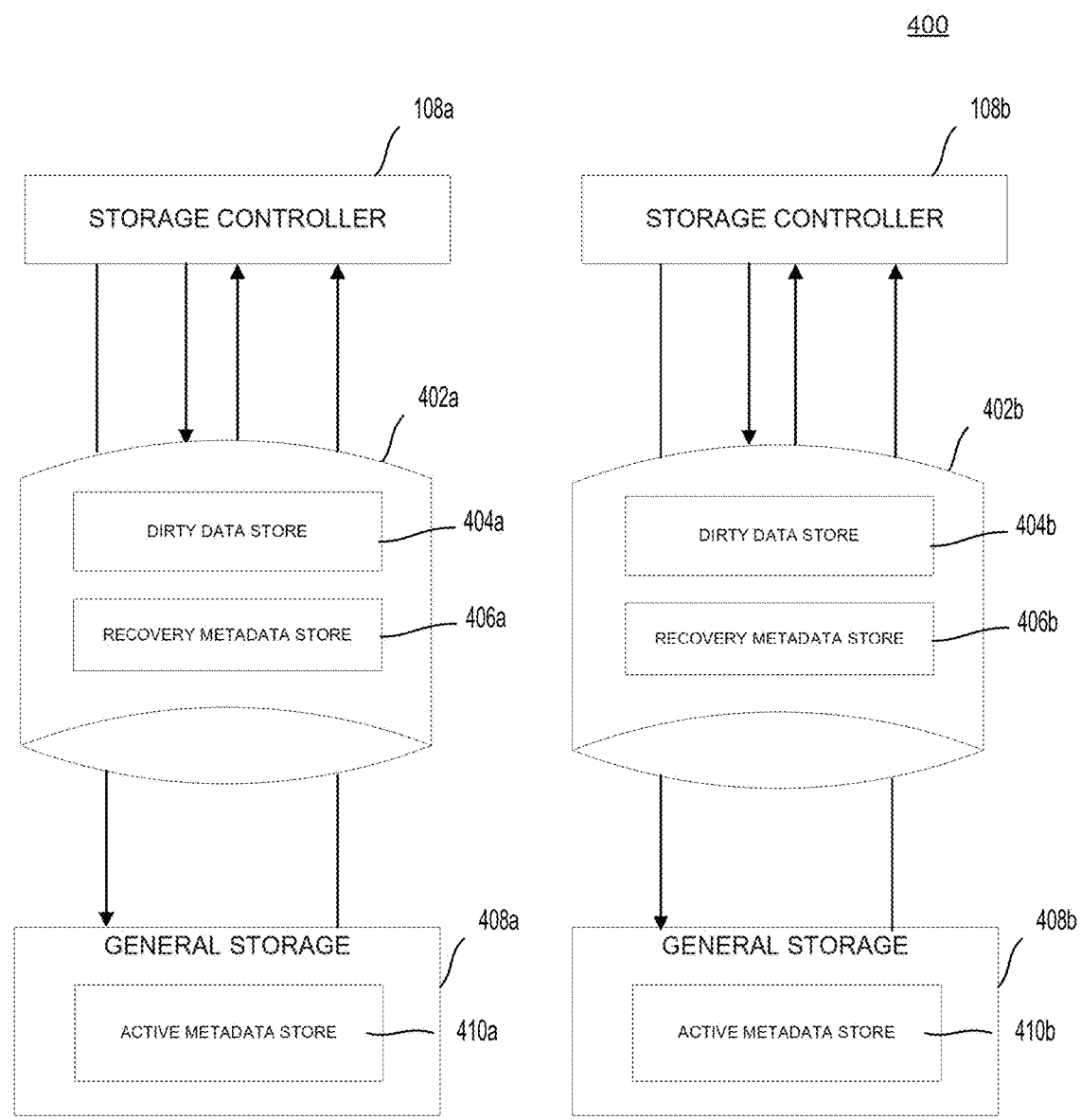
FIG. 4 is a block diagram of two controllers storing data from multiple logic units using a solid state drive (SSD) volume, according to an embodiment.

FIG. 4 is a block diagram 400 of two controllers storing data from multiple logic units using a solid state drive (SSD), according to an embodiment. FIG. 4 illustrates storage controller 108a and storage controller 108b storing data in SSD volumes. For example, storage controller 108a is associated with a SSD volume 402a and storage controller 108b is associated with SSD volume 402b. SSD volume 402a stores dirty data and metadata for the LUNs assigned to storage controller 108a, and SSD volume 402b stores dirty data and recovery metadata for the LUNs assigned to storage controller 108b. In one embodiment, SSD volume 402a and SSD volume 402b are redundant RAID volume SSDs that can be mirrored as in RAID 1 or protected with one or more parities as in RAID 5 and RAID 6. For this reason, SSD volume 402a and SSD volume 402b can store multiple copies of the dirty data and the recovery metadata. A person skilled in the art will appreciate that although embodiments here are described in terms of SSD or RAID SSD, the implementation is not limited to SSDs and can be applied to other non-volatile memory storages. In a further embodiment, SSD volume 402a and SSD volume 402b may be a combination of multiple SSDs that are group together into two SSD volumes of equal or approximately equal capacity.

In an embodiment, SSD volume 402a is divided into two regions. The first region is a recovery metadata store 406a and stores recovery metadata for the LUNs assigned to the storage controller 108a. As discussed above, recovery metadata includes information that allows storage controller 108a to recreate dirty data for the LUN. The second region is a cached user data store or dirty data store 404a. The dirty data store 404a stores the dirty data that is indicative of the changes in a LUN that have not yet posted to the storage devices 106. In an embodiment, the dirty data store 404a is divided into equal sized groups of bytes or cache blocks.

Similarly, SSD volume 402b is divided into two regions. The first region is a recovery metadata store 406b and stores recovery metadata for the LUNs assigned to the storage controller 108b. The second region is a dirty data store 404b. In an embodiment, the dirty data store 404b is divided into equal sized groups of bytes or cache blocks.

In an embodiment, FIG. 4 also illustrates a general storage 408a and general storage 408b. General storage 408a and general storage 408b may be part of a single storage or separate storages. Further general storage 408a and general storage 408b may be a cache storage or permanent storage. In an embodiment, general storage 408a includes an active metadata store 410a. The active metadata store 410a stores active metadata which facilitates the storage controller 108a to manage I/O operations and transactions of data to and from SSD volume 402a. In an embodiment, general storage 408b includes active metadata store 410b. The active metadata store 410b stores active metadata necessary to for the storage controller 108b to manage I/O operations and transactions of data to and from SSD volume 402b.

As discussed in FIG. 2, storage controller 108a is assigned a unique set of LUNs and storage controller 108b is assigned a different set of LUNs. Storage controller 108a and 108b then processes I/O requests for LUNs in their respective sets. For example, when storage controller 108a receives a write request from host 104, storage controller 108a creates cache blocks that store the dirty data from the write request. In an embodiment, storage controller 108a also creates an active metadata and recovery metadata that is associated with the dirty data. Storage controller 108a may store the active metadata in the active metadata store 410a and the recovery metadata in the recovery metadata store 406a within SSD volume 402a.

In an embodiment, storage controller 108b similarly processes a write request for a LUN associated with storage controller 108b. In particular, storage controller 108b uses SSD volume 402b to store the dirty data and the recovery metadata, and the active metadata store 410b to store the active metadata.

In a further embodiment, storage controller 108a does not track active metadata in the active metadata store 410b and storage controller 108b does not track active metadata in the active metadata store 410a.

In an embodiment, storage controller 108a uses SSD volume 402a and general storage 408a to process I/O requests for a LUN assigned to storage controller 108a. Although the embodiments below will be described with reference to the storage controller 108a, a person of ordinary skill in the art will appreciate that storage controller 108b similarly processes I/O requests for a LUN assigned to storage controller 108b. For example, when storage controller 108a receives an I/O request from host 104, storage controller 108a allocates cache blocks in the dirty data store 404a. Storage controller 108a then stores data associated with the I/O request in the cache blocks allocated in the dirty data store 404a as dirty data. Next, storage controller 108a also generates an active metadata and recovery metadata for the data in the I/O request and stores the active metadata in the active metadata store 410a and recovery metadata in the recovery metadata store 406a.

In an embodiment, storage controller 108a may transfer ownership of a LUN to storage controller 108b. When the cache blocks in the dirty data store 404a are relatively small, storage controller 108a flushes the dirty data to the storage devices 106, as discussed below. For example, storage controller 108a suspends all new I/O requests and completes existing I/O requests. Then storage controller 108a transfers the dirty data in the dirty data store 404a of SSD volume 402a to storage devices 106 and purges the dirty data from the SSD volume 402a. Once the ownership of a LUN is re-assigned from storage controller 108a to storage controller 108b, storage controller 108b begins to process I/O requests from the host 104 for the re-assigned LUN. During the purge however, disruption in processing the I/O requests by the storage controllers 108a and 108b may have an effect on performance of the storage system 102.

Hence, when transferring ownership of a LUN that stores dirty data in caches or SSD volumes that include terabytes of data, storage controller 108a does not flush the dirty data to the storage devices 106 during the ownership transfer. In fact, storage controller 108a may defer flushing the dirty data until a time where the storage system 102 experiences down time, or upon start-up or shut-down of the storage system 102. Instead, when storage system 102 re-assigns ownership of a LUN from storage controller 108a to storage controller 108b, storage controller 108b scans recovery metadata store 406a for the recovery metadata associated with the LUN. Storage controller 108b then creates active metadata for the LUN from the recovery metadata identified during the scan. Storage controller 108b also tags the active metadata to indicate that the dirty data for the transferred LUN is in the dirty data store 404a of SSD volume 402a, and stores the active metadata in the active metadata store 410b. At this point, storage controller 108b manages active metadata for the dirty data in dirty data store 404b of SSD volume 402b and the dirty data associated with the LUN in dirty data store 404a of SSD volume 402a. Also, storage controller 108a scans active metadata store 410a and removes the active metadata associated with the re-assigned LUN from the active metadata store 410a.

After the transfer of ownership of the LUN completes, storage controller 108b processes the I/O request for the LUN. In an embodiment, the processing on the I/O request depends on whether the I/O request is a read request or a write request, and whether SSD volume 402a or 402b stores the dirty data for the LUN. For example, when host 104 issues a read request, storage controller 108b can service the read request using dirty data store 404a or 404b.

In another example, when host 104 issues an I/O write request, storage controller 108b determines whether dirty data exists in the dirty data store 404a of SSD volume 402a. If the dirty data does not exist, storage controller 108b can perform the write request using dirty data store 404b of SSD volume 402b, as described above.

In an embodiment where the dirty data exists, the storage controller 108b allocates cache blocks in the dirty data store 404b and stores the new dirty data from host 104 into the dirty data store 404b in SSD volume 402b. Next, the storage controller 108b generates active metadata and recovery metadata for the I/O write request. The generated active metadata is stored in the active metadata store 410b. The generated recovery metadata is stored in the recovery metadata store 406b. Next, storage controller 108b merges non-overwritten dirty data from the dirty data store 404a in SSD volume 402a into dirty data store 404b in SSD volume 402b. Once the merge completes, the storage controller 108b updates the active metadata store 410b and the recovery metadata store 406b with the active metadata and the recovery metadata generated from the merge. Additionally, the storage controller 108a updates the active metadata store 410a and recovery metadata store 406a to indicate that the dirty data merged from the dirty data store 404a is no longer in use. Further, storage controller 108b writes the updated recovery metadata in the recovery metadata store 406b to the recovery metadata store 406a. Additionally, the active metadata in the active metadata store 410a that is associated with the merged dirty data is deleted. Finally, storage controller 108a, receives a message from, for example, storage controller 108b indicating that the cache block(s) in the dirty data store 404a that stored the dirty data for the re-assigned LUN are no longer used and can be re-allocated for other I/O requests.

Figure 5A:
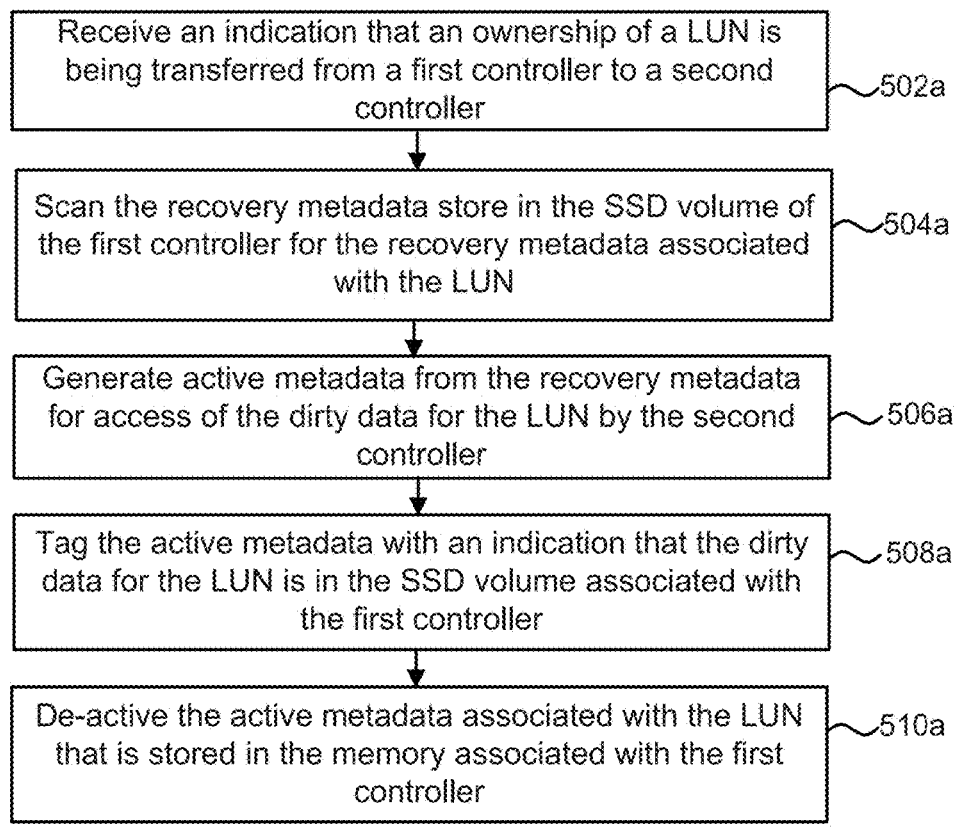
FIG. 5A is a flowchart of a method for transferring ownership of a logic unit from a first controller to a second controller, according to an embodiment.

FIG. 5A is a flowchart of a method 500A for transferring ownership of a LUN from a first controller to a second controller, according to an embodiment. In this embodiment, the first controller is storage controller 108a and the second controller is the storage controller 108b. Method 500A may be implemented in hardware, software, or a combination thereof, of the components described in FIGS. 1 and 4. Prior to the method 500A, the storage controller 108a stores data for the LUNs assigned to the storage controller 108a in SSD volume 402a. Similarly, the storage controller 108b stores data for the LUNs assigned to the storage controller 108b in SSD volume 402b.

At operation 502a, an indication is received that the ownership of a LUN is being transferred. For example, storage controller 108b receives an indication that a LUN associated with storage controller 108a is being transferred to storage controller 108b.

At operation 504a, the recovery metadata store for the recovery metadata associated with the LUN is scanned. For example, storage controller 108b scans the recovery metadata store 406a of SSD volume 402 for the recovery metadata that is associated with the LUN being transferred.

At operation 506a, active metadata is generated for the second storage controller. For example, storage controller 108b generates active metadata for the LUN from the recovery metadata obtained in operation 504.

At operation 508a, the active metadata is tagged with an indication indicating that the dirty data exists in the SSD volume associated with the first controller. For example, storage controller 108b stores the generated active metadata in the active metadata store 410b and tags the active metadata to indicate that the active metadata is associated with the dirty data stored in the dirty data store 404a of the SSD volume 402a.

At operation 510a, the active metadata associated with the first storage controller is deactivated. For example, storage controller 108a deactivates the active metadata associated with LUN being transferred in the active metadata store 410a.

Figure 5B:
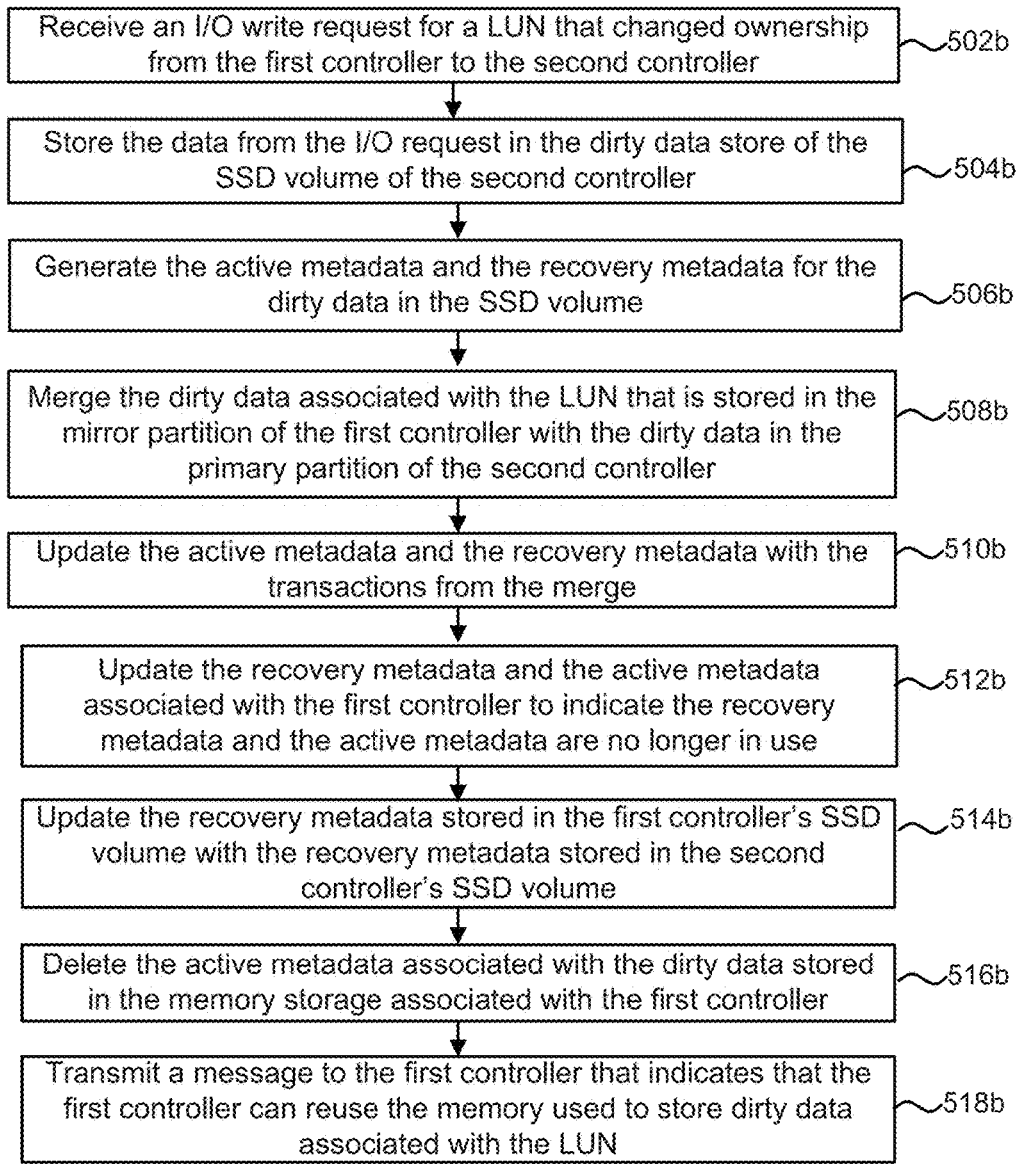
FIG. 5B is a flowchart of a method for processing a write request after the ownership of a logic unit is transferred from a first controller to a second controller, according to an embodiment.

FIG. 5B is a flowchart of a method 500B for processing a write request after the ownership of a LUN is transferred from the first controller to the second controller, according to an embodiment. In method 500, the first controller is the storage controller 108a and the second controller is the storage controller 108b, according to an embodiment. Method 500B may be implemented in hardware, software, or a combination thereof, of the components described in FIGS. 1 and 4, according to an embodiment.

At operation 502b, an I/O write request for a LUN that changed ownership is received. For example, storage controller 108b receives an I/O write request from the host 104. In an embodiment, the I/O write request is for a LUN whose ownership has been re-assigned from the storage controller 108a to the storage controller 108b.

At operation 504b, the data in the I/O write request is stored in the SSD volume of a second storage controller. For example, storage controller 108b allocates one or more cache blocks in the dirty data store 404b of the storage controller's 108b SSD volume 402b. Storage controller 108b then stores the new data for the I/O request from host 104 in the one or more cache blocks in the dirty data store 404b as dirty data.

At operation 506b, the active metadata and the recovery metadata are generated. For example, storage controller 108b generates active metadata and recovery metadata for the data in the I/O request, and stores the active metadata in the active metadata store 410b and the recovery metadata in the recovery metadata store 406b.

At operation 508b, the dirty data for the LUN associated with the first storage controller is merged. For example, storage controller 108b merges non-overwritten dirty data for the LUN from the dirty data store 404a in the storage controller's 108a SSD volume 402a into the dirty data store 404b in the storage controller's 108b SSD volume 402b.

At operation 510b, the active data and the recovery data are updated with the transactions from the merge. For example, storage controller 108b generates the active metadata and recovery metadata for the transactions from the merge, and updates the active metadata store 410b and the recovery metadata store 406b with the generated active metadata and the recovery metadata.

At operation 512b, the active metadata store and the recovery metadata store associated with the first storage controller of the LUN are updated to indicate that the active metadata and the recovery metadata are no longer in use. For example, storage controller 108b updates active metadata in the active metadata store 410a and the recovery metadata in the recovery metadata store 406a to indicate that the dirty data for the LUN stored in the dirty data store 404a of SSD volume 402 is no longer in use.

At operation 514b, the recovery data in the first storage controller's SSD volume is update with the recovery data in the second storage controller's SSD volume. For example, storage controller 108b updates the recovery metadata stored in recovery metadata store 406a with the recovery metadata stored in the recovery metadata store 406b.

At operation 516b, the active metadata associated with the dirty data stored in the SSD volume of the first controller is deleted. For example, the storage controller 108a deletes the active metadata in the active metadata 410a that is associated with the dirty data in the dirty data store 404a.

At operation 518b, a message is transmitted to the first controller indicating that the first controller is able to reuse the cache blocks in the SSD volume. For example, storage controller 108b sends a message to storage controller 108a that the cache block(s) in the dirty data store 404a are free, and that the storage controller 108a can re-use the cache block(s) for another I/O request.

Figure 6A:
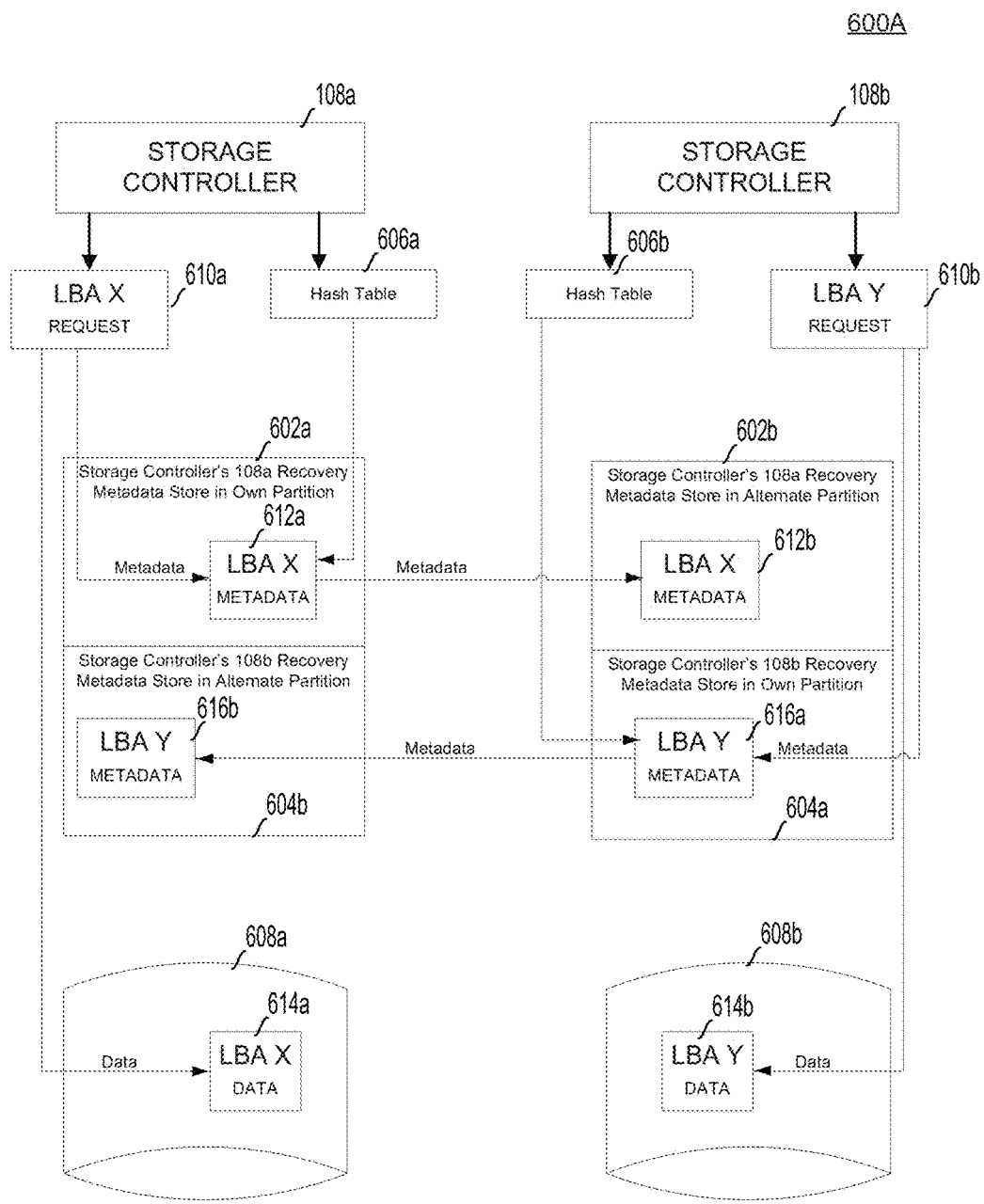
FIG. 6A is a block diagram illustrating processing of a write request in an SSD volume before an ownership change of a logic unit, according to an embodiment.

FIG. 6A is a block diagram 600A illustrating processing of a write request in an SSD volume before an ownership change of a LUN, according to an embodiment. In block diagram 600A, storage controller 108a is associated with an LUN LBA X and storage controller 108b is associated with LUN LBA Y, according to one embodiment. Further block diagram 600A illustrates an alternative embodiment of the recovery metadata stores described in FIG. 4. In particular, the recovery metadata stores in block diagram 600A are stored separately from the SSD volume. The recovery metadata stores may be stored in memories associated with the respective storage controllers or in another memory storage.

For example, block diagram 600A includes a recovery metadata store 602a which stores recovery metadata for storage controller 108a, and a recovery metadata store 602b that stores a copy of the recovery metadata for storage controller 108a. In an embodiment, recovery metadata store 602a is located in the memory space associated with the storage controller 108a, and the copy of the recovery metadata store 602b is located in the memory space associated with the storage controller 108b. Also, block diagram 600A includes a recovery metadata store 604a which stores recovery metadata for storage controller 108b and recovery metadata store 604b which stores a copy of the recovery metadata for storage controller 108b. In an embodiment, recovery metadata store 604a is located in the memory space associated with the storage controller 108b, and the copy of the recovery metadata store 606b is located in the memory space associated with the storage controller 108a.

In an embodiment, block diagram 600A includes a hash table 606a and hash table 606b. The discussion of hash tables 606a and 606b is exemplary and non-limiting, and other memory structures can also be used to achieve the functionality of hash tables 606a and 606b. In an embodiment, the storage controller 106a uses hash table 606a to determine whether recovery metadata for a LUN LBA X is in recovery metadata store 602a and recovery metadata store 604b, and also the memory location of the recovery metadata in recovery metadata store 602a and recovery metadata store 604b. Similarly, the storage controller 106b uses hash table 606b to determine whether recovery metadata for a LUN LBA Y is in the recovery metadata store 602b and recovery metadata store 604a, and also the memory location of the recovery metadata.

In an embodiment, block diagram 600A includes an SSD volume 608a and SSD volume 608b. SSD volume 608a stores data, such as dirty data, for LUNs assigned to storage controller 108a and SSD volume 608b stores data, such as dirty data, for LUNs assigned to storage controller 108b. In an embodiment, SSD volume 608a and SSD volume 608b may store terabytes of storage.

In an embodiment, storage controller 108a and storage controller 108b can receive I/O requests for LUNs assigned to each storage controller from hosts 104. When storage controller 108a receivers an I/O request to process LUN LBA X, shown as LBA X request 610a, storage controller 108a generates recovery metadata 612a for the LBA X request 610a. Storage controller 108a then uses hash table 606a to identify a location in the recovery metadata store 602a to store recovery metadata 612a. The recovery metadata store 602a is associated with the storage controller 108a and is located inside the memory partition allocated for the storage controller 108a. In an embodiment, storage controller 108a also stores a copy of the recovery metadata 612a in the recovery metadata store 602b as recovery metadata 612b. The recovery metadata store 602b is associated with the storage controller 108a but is located in the memory space of the storage controller 108b. Additionally, storage controller 108a also allocates one or more cache blocks in SSD volume 608a to store the dirty data 614a for LUN LBA X.

When storage controller 108b receivers an I/O request to process LUN LBA Y, shown as LBA Y request 610b, storage controller 108a generates recovery metadata 616a for the I/O request LBA Y request 610b. Storage controller 108b then uses hash table 606b to identify a location in the recovery metadata store 604a to store recovery metadata 616a. The recovery metadata store 604a is associated with the storage controller 108b and is located inside the memory partition allocated for the storage controller 108b. In an embodiment, storage controller 108b also stores a copy of the recovery metadata 616a in the recovery metadata store 604b as recovery metadata 616b. The recovery metadata store 604b is associated with the storage controller 108b but is located in the memory space of the storage controller 108a. Additionally, storage controller 108b also allocates one or more cache blocks in SSD volume 608b to store the dirty data 614b for LUN LBA X.

As discussed above, storage system 102 may reassign ownership of a LUN from one storage controller to another. For example, storage system 102 may reassign ownership of LUN LBA X from storage controller 108a to storage controller 108b.

Figure 6B:
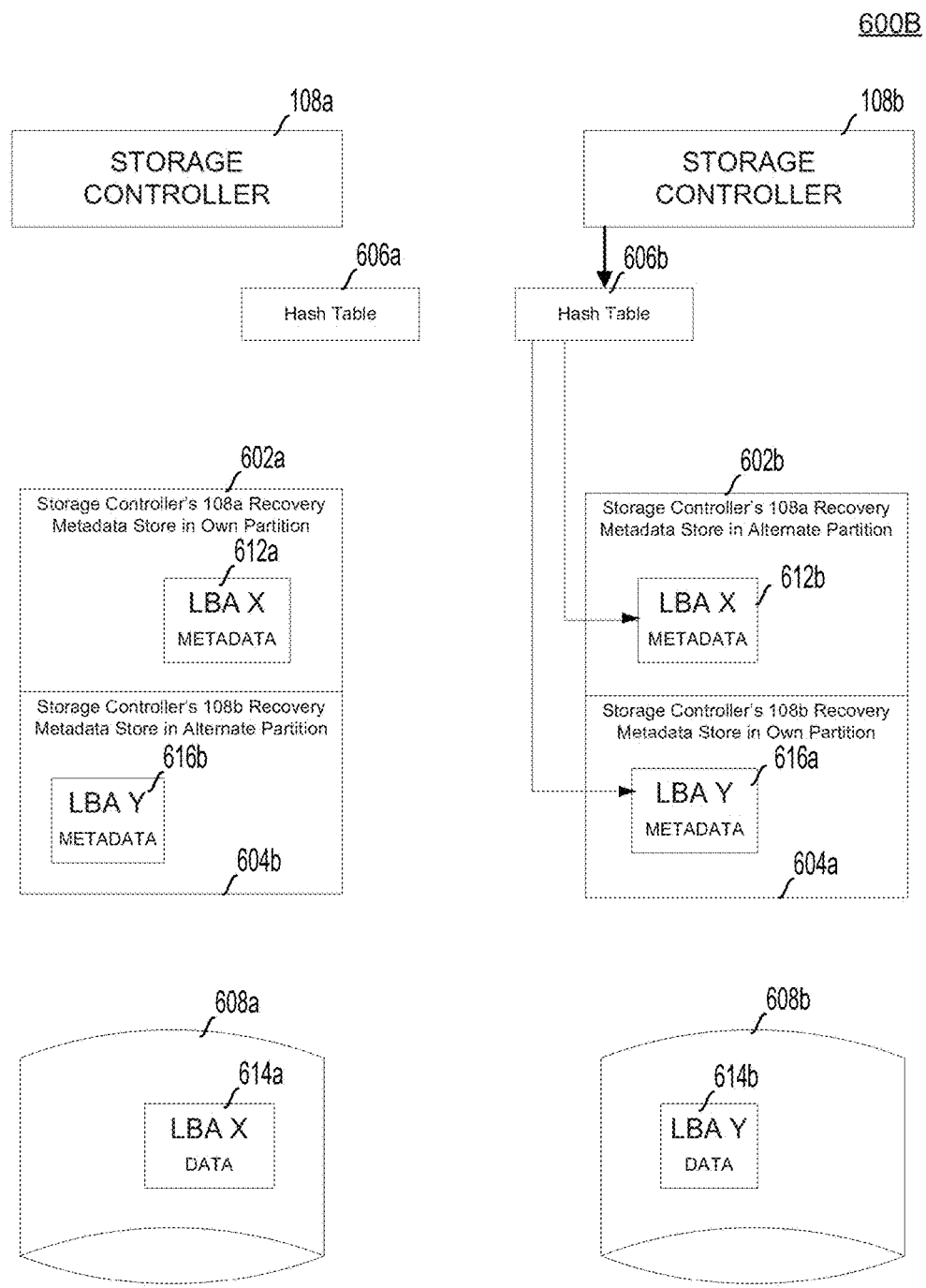
FIG. 6B is a block diagram illustrating a change of ownership of a logic unit from a first storage controller to a second storage controller using an SSD volume, according to an embodiment.

FIG. 6B is a block diagram 600B illustrating a change of ownership of a LUN from storage controller 108a to storage controller 108b in an SSD volume, according to an embodiment. In an embodiment, the change of ownership occurs after storage controller 108a received an I/O request to process LBA X as discussed in FIG. 6A. After the change in ownership, LBA X and LBA Y are assigned to storage controller 108b.

In an embodiment, when a change in ownership occurs, storage controller 108a removes access to recovery metadata 612a for LBA X from hash table 606a. Once storage controller 108a removes access, storage controller 108a can no longer access recovery metadata 612a, using, for example, hash table 606a. In an embodiment, recovery metadata 612a may still exist in recovery metadata store 602a. In another embodiment, recovery metadata 612a may also be removed from the recovery metadata store 602a (not shown).

In an embodiment, when a change in ownership occurs, storage controller 108b adds access to recovery metadata 612b stored in recovery metadata 602b to hash table 606b. As discussed with reference to FIG. 6A, recovery metadata 612 is a copy of the recovery metadata 612a. Storage controller 108b can then use hash table 660b to access recovery metadata 612b for LBA X.

Figure 6C:
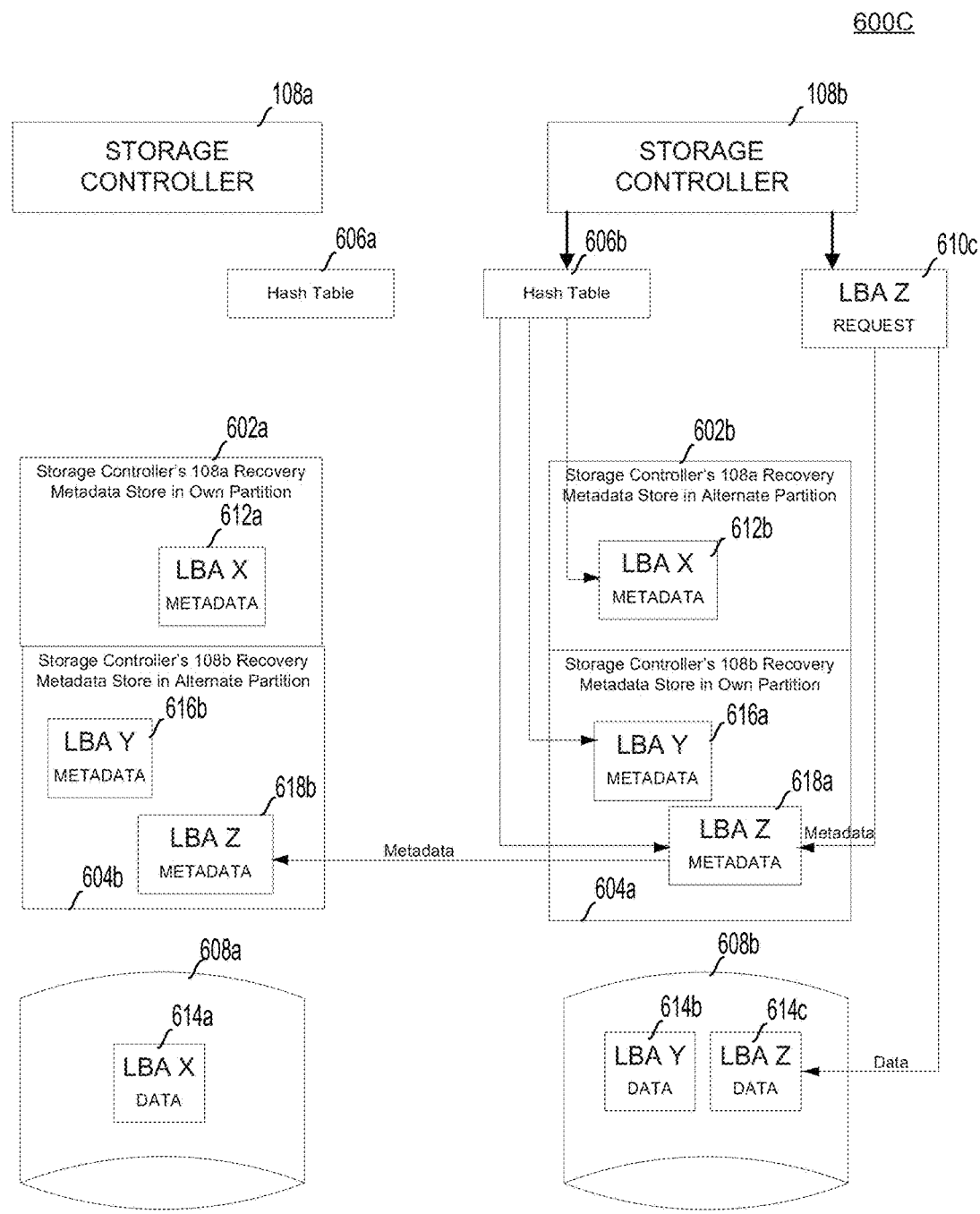
FIG. 6C is a block diagram illustrating a write request in an SSD volume after an ownership change of a logic unit, according to an embodiment.

FIG. 6C is a block diagram 600C illustrating a write request in an SSD volume after an ownership change of a LUN, according to an embodiment. In block diagram 600C, storage controller 108b is associated with LUNs LBA Y and LBA X and the write request occurs sometime after the storage system 102 assigned LBA X to storage controller 108b.

In an embodiment, storage controller 108b receives an I/O requests for a LUN LBA Z, which is assigned to storage controller 108b. When storage controller 108b receivers an I/O request to process LUN LBA Z, shown as LBA Z request 610c, storage controller 108b generates recovery metadata 618a for LBA Z request 610c. Storage controller 108b then uses hash table 606b to identify a memory location in the recovery metadata store 604a to store recovery metadata 618a. In an embodiment, storage controller 108b also stores a copy of the recovery metadata 618a in the recovery metadata store 604b as recovery metadata 618b. Additionally, storage controller 108b also allocates one or more cache blocks in SSD volume 608b to store the dirty data 614c for LBA Z request 610c.

Figure 6D:
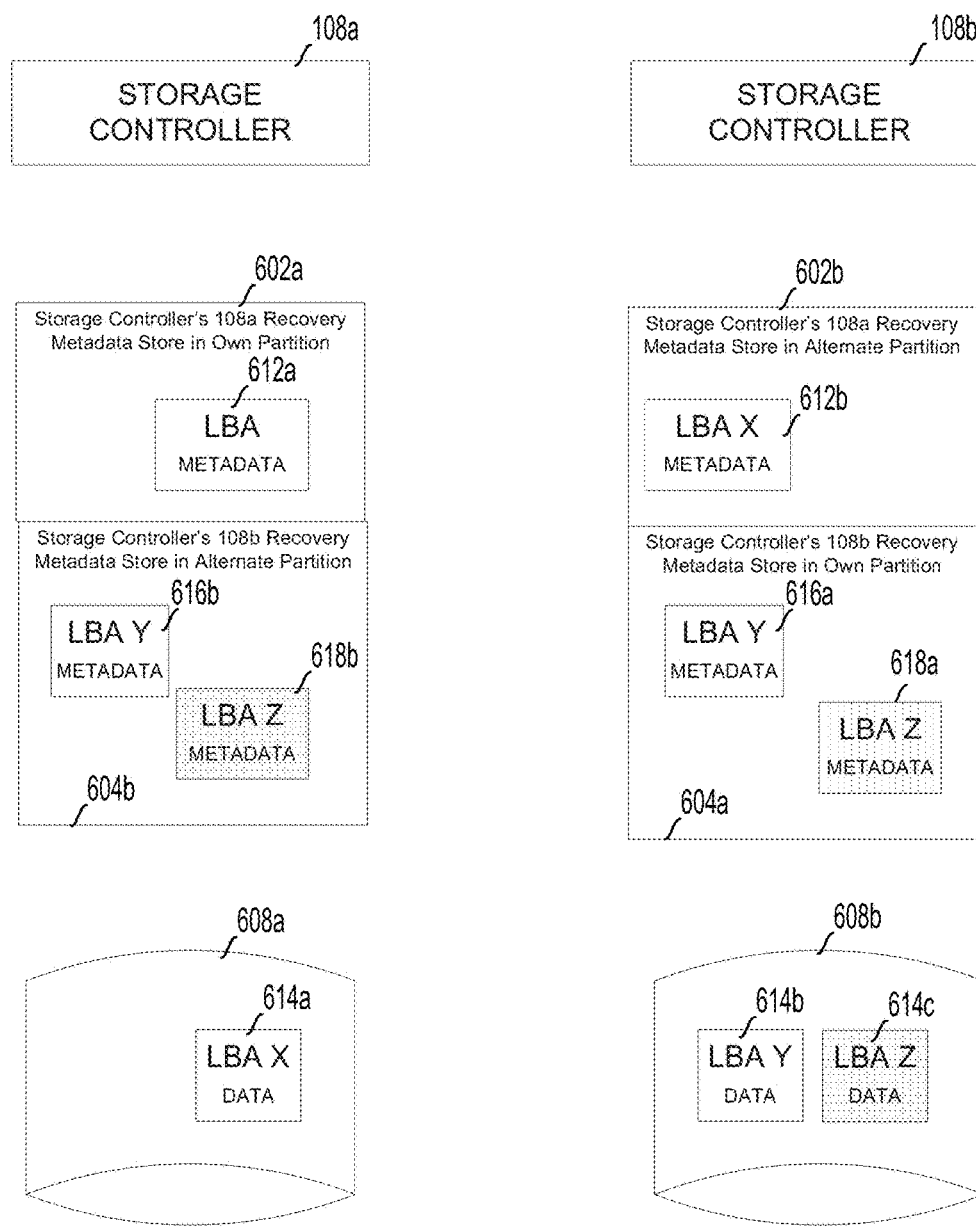
FIG. 6D is a block diagram illustrating flushing data from an SSD volume to a storage drive, according to an embodiment.

FIG. 6D is a block diagram 600D illustrating flushing data from an SSD volume to storage devices 106, according to an embodiment. In block diagram 600D, storage controller 108b flushes the dirty data 614c associated with LUN LBA Z to storage devices 106. As discussed above, LUN LBA Z was originally assigned to the storage controller 108b and is stored in the recovery metadata store 604a that is associated with the storage controller 108b. Once storage controller 108b flushes the data, SSD volume 608b can obtain a clean copy of data from storage devices 106, which is stored in 614c. In an embodiment, storage controller 108b marks the data and recovery metadata associated with LUN LBA Z as clean data and recovery metadata, which is shown as grayed out boxes 614c, 618a, and 618b. A clean copy of data is the same data as the data stored on the storage devices 106. In a further embodiment, storage controller 108b un-mirrors recovery metadata 618b from recovery metadata 618a. In an embodiment, once storage controller 108b un-mirrors recovery metadata 618b from recovery metadata 618a, storage controller 108b can processes I/O read requests for LUN LBA Z. In an embodiment, when the storage controller 108b un-mirrors the recovery metadata 618a, 618b, the storage controller 108b removes an association between recovery metadata 618a and recovery metadata 618b.

Figure 6E:
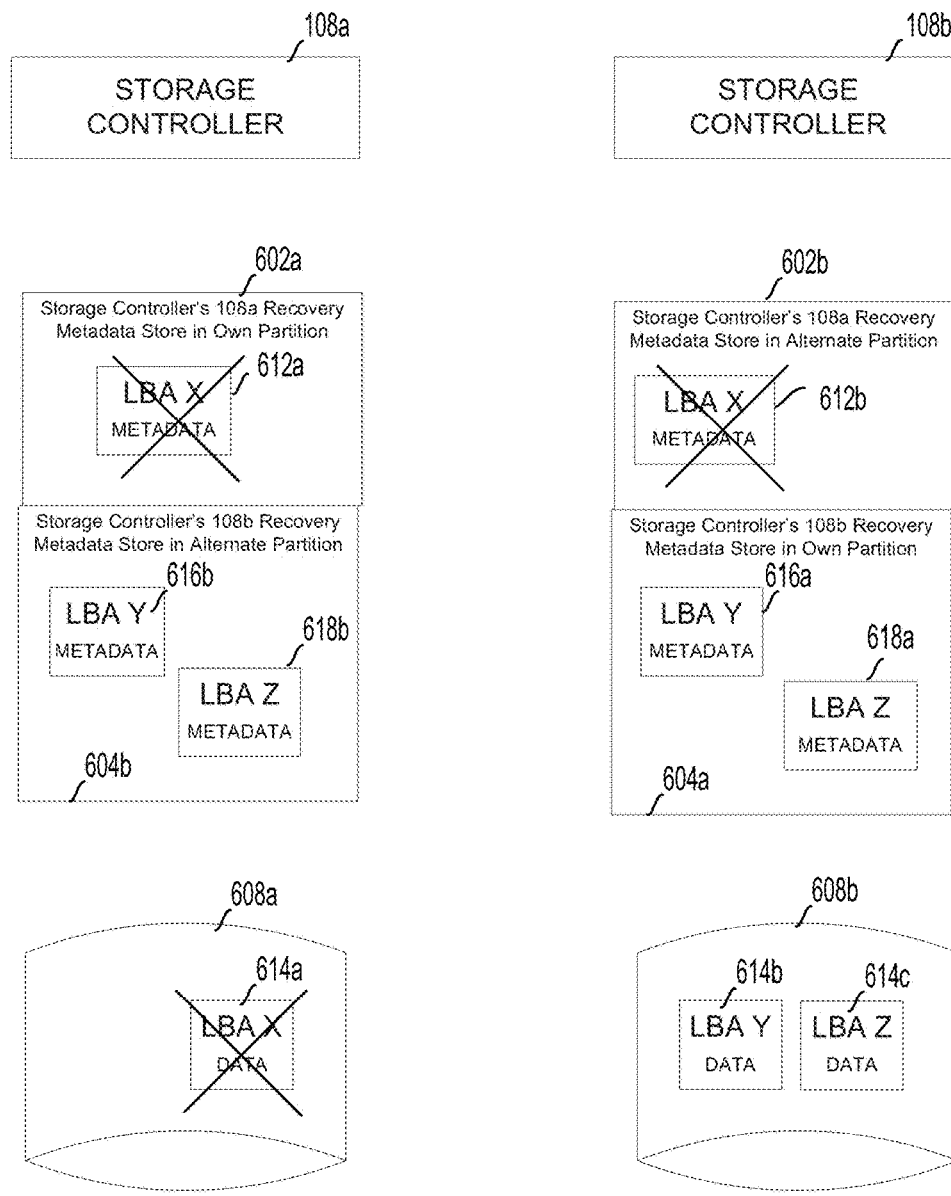
FIG. 6E is a block diagram illustrating flushing data from an SSD volume to a storage drive for a logic unit whose ownership was re-assigned to a second storage controller, according to an embodiment.

FIG. 6E is a block diagram 600E illustrating flushing data from an SSD volume to storage devices 106 for a LUN whose ownership was re-assigned to another storage controller, according to an embodiment. In block diagram 600E, storage controller 108b flushes the dirty data 614a associated with LUN LBA X to storage devices 106. As discussed with reference to FIG. 6B, the ownership of LUN LBA X was re-assigned from the storage controller 108a to storage controller 108b. And because the ownership was re-assigned while the storage controller 108a stored recovery metadata 612a and dirty data 614a in the recovery metadata store 602a and SSD volume 608a associated with the storage controller 108a, storage controller 108b also stores a copy of the recovery metadata in recovery metadata 612b in the recovery metadata store 602b associated with the storage controller 108b.

In an embodiment, storage controller 108b flushes LUN LBA X to the storage devices 106. After the flush, storage controller 108b removes recovery metadata 612b from the recovery metadata store 602b, and also sends a message to the storage controller 108a to remove recovery metadata 612a from the recovery metadata store 602a. Once recovery metadata 612a and recovery metadata 612b are removed, storage controller 108a can re-use the memory space in the recovery metadata store 602a for an I/O request for another LUN, and storage controller 108b can no longer access the dirty data 614a for LUN LBA X for read requests. To process read requests for LUN LBA X, storage controller 108b can upload the clean copy of data for LUN LBA X from the storage devices 106 into SSD volume 608b (not shown).

In this implementation, the flushing to the storage devices 106 ensures that the memory of storage controller 108a is free to process I/O requests for other LUNs.

Figure 6F:
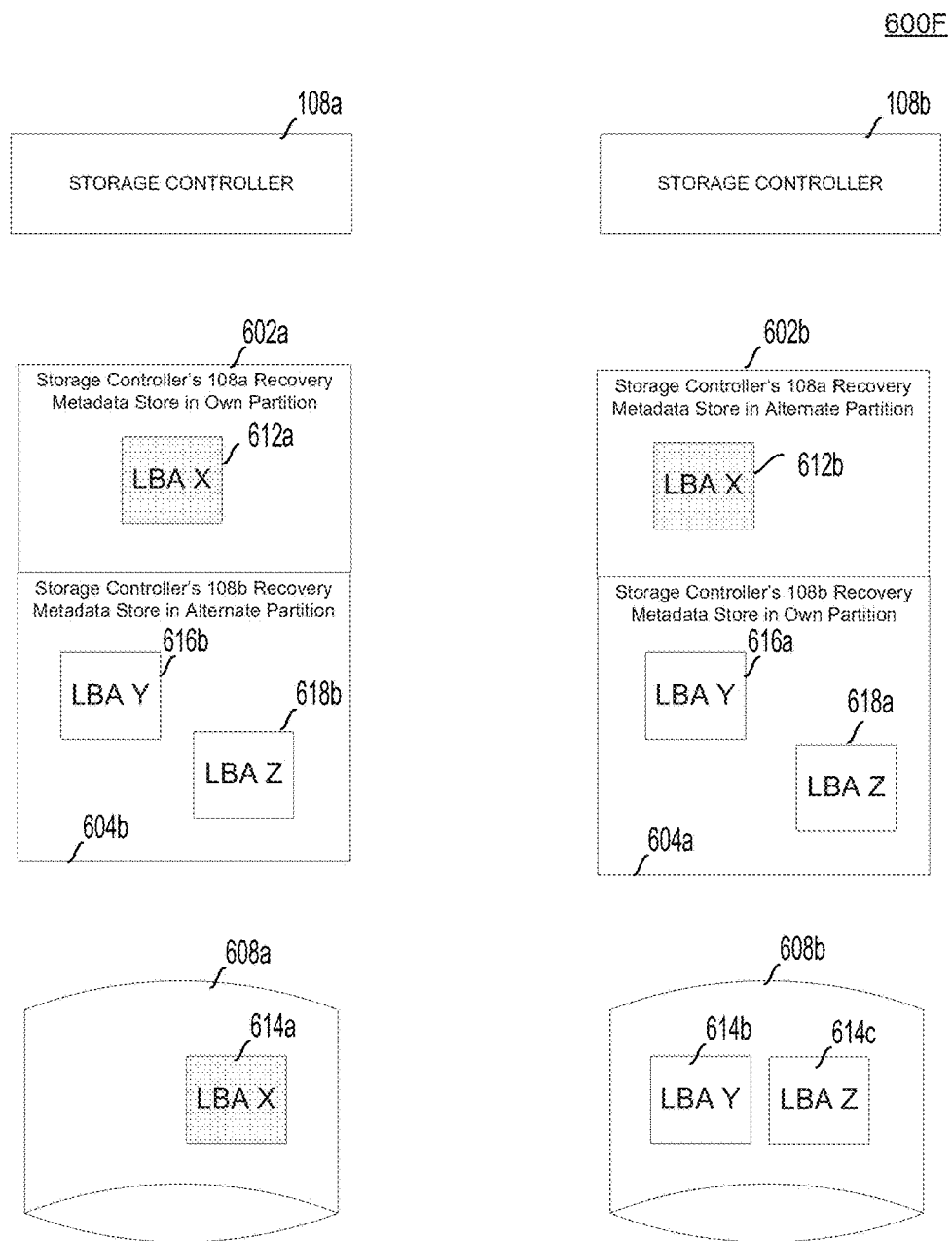
FIG. 6F is a block diagram of a diagram illustrating flushing data from an SSD volume to a storage drive for a logic unit whose ownership was re-assigned from a first controller to a second controller, according to an embodiment.

FIG. 6F is a block diagram 600F of a diagram illustrating flushing data in an SSD volume to storage devices 106 from a LUN whose ownership was re-assigned from a first controller to a second controller, according to an embodiment. Embodiment described in block diagram 600F may be an alternative embodiment to the embodiment described in block diagram 600E.

In block diagram 600F, storage controller 108b flushes the dirty data 614a associated with LUN LBA X to storage devices 106. After the flush, storage controller 108b marks recovery metadata 612b stored in the recovery metadata store 602b as clean recovery metadata and also marks dirty data 614a as clean data. Additionally, storage controller 108b un-mirrors recovery metadata 612b from recovery metadata 612a. In an embodiment, once storage controller 108b un-mirrors recovery metadata 612b from recovery metadata 612a, storage controller 108b can processes I/O read requests from LUN LBA X. However, storage controller 108a cannot use the memory space in recovery metadata store 602a and SSD volume 608a that was allocated for LUN LBA X to process other I/O requests.

In various embodiments, the technique is performed by using various combinations of dedicated, fixed-function computing elements and programmable computing elements executing software instructions. Accordingly, it is understood that any of the steps of methods described herein may be implemented by a computing system using corresponding instructions stored on or in a non-transitory machine-readable medium accessible by the processing system. For the purposes of this description, a tangible machine-usable or machine-readable medium can be any apparatus that can store the program for use by or in connection with the instruction execution system, apparatus, or device. The medium may include non-volatile memory including magnetic storage, solid-state storage, optical storage, cache memory, and/or Random Access Memory (RAM).

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   storing, using a first controller, data and recovery metadata of a storage volume owned by the first controller in a primary partition of a memory cache of the first controller, and a copy of the data and the recovery metadata in a mirror partition of a memory cache of a second controller that is allocated to the first controller;
   receiving an indication of an ownership change for the storage volume from the first controller to the second controller;
   scanning, using the second controller, the mirror partition allocated to the first controller for the recovery metadata associated with the storage volume;
   generating an active metadata from the recovery metadata scanned from the mirror partition, wherein the active metadata manages input/output (I/O) requests for the data stored in the mirror partition; and
   using the active metadata to access the data in the mirror partition allocated to the first controller to process an input/output (I/O) request associated with the storage volume using the second controller.

2. The method of claim 1, wherein the recovery metadata is metadata required to recreate data associated with the storage volume in a primary partition of the second controller.

3. The method of claim 1, wherein the data comprises dirty data associated with the storage volume that has not been flushed to an array of storage drives.

4. The method of claim 1, further comprising:
   marking the active metadata with an indication that the active metadata is associated with the data in the mirror partition and data in a primary partition of the memory cache of the second storage controller, wherein the data in the mirror partition is associated with the first controller and the data in the primary partition is associated with a second controller.

5. The method of claim 1, wherein the memory cache of the first controller is a first dynamic random access memory (DRAM) cache comprising the primary partition that stores a first data associated with the first controller and a mirror partition that stores data associated with the second controller, and wherein the memory cache of the second controller is a second DRAM cache comprising a primary partition that stores a second data associated with the second controller and the mirror partition associated with the first controller, and wherein the mirror partition in the second DRAM cache stores a copy of a first data in the primary partition of the first DRAM cache, and wherein the mirror partition in the first DRAM cache stores a copy of a second data in the primary partition of the second DRAM cache.

6. The method of claim 5, wherein the first data comprises the data and the recovery metadata for the storage volume before the ownership change.

7. The method of claim 5, wherein the second data comprises data and metadata for the storage volume after the ownership change.

8. The method of claim 1, wherein the second controller is associated with a general storage separate from the memory cache, and the method further comprises storing the generated active metadata associated with the storage volume in the general storage.

9. The method of claim 1, wherein the memory cache is a DRAM cache comprising a primary partition and the method further comprises storing dirty data and recovery metadata associated with the storage volume in the primary partition after the second storage controller receives ownership of the storage volume, wherein the dirty data includes a portion of the data in the mirror partition.

10. A non-transitory machine readable medium having stored thereon instructions for performing a method comprising machine executable code, which when executed by at least one machine, causes the machine to:
store, using a first controller, data and recovery metadata of a storage volume owned by the first controller in a primary partition of a memory cache of the first controller, and a copy of the data and the recovery metadata in a mirror partition of a memory cache of a second controller that is allocated to the first controller;
receive an indication of an ownership change for the storage volume from the first controller to the second controller;
scan using the second controller, the mirror partition allocated to the first controller for recovery metadata associated with the storage volume;
generate an active metadata from the scanned recovery metadata, wherein the active metadata manages input/output (I/O) requests for the data stored in the mirror partition; and
use the active metadata to access the data in the mirror partition allocated to the first controller to process an input/output (I/O) request associated with the storage volume using the second controller.

11. The non-transitory machine readable medium of claim 10, wherein the data is dirty data associated with the storage volume that has not been flushed to the hard disk drive.

12. The non-transitory machine readable medium of claim 10, further comprising instructions for performing the method comprising machine executable code, which when executed by at least one machine, further causes the machine to:
mark the active metadata with an indication indicating that the active metadata is associated with the data in the mirror partition and data in a primary partition of the memory cache, wherein the data in the mirror partition is associated with the first controller and the data in the primary partition is associated with a second controller.

13. The non-transitory machine readable medium of claim 10, wherein the second controller is associated with a general storage and the instructions for performing the method comprising machine executable code, which when executed by at least one machine, further causes the machine to:
store the generated active metadata associated with the storage volume in the general storage.

14. The non-transitory machine readable medium of claim 10, wherein the memory cache is a DRAM cache comprising a primary partition and wherein the instructions for performing the method comprising machine executable code, which when executed by at least one machine, further causes the machine to:
store dirty data and recovery metadata associated with the storage volume in the primary partition after the second storage controller receives ownership of the storage volume, wherein the dirty data includes a portion of the data in the mirror partition.

15. The non-transitory machine readable medium of claim 10, wherein the instructions for performing the method comprising machine executable code, which when executed by at least one machine, further causes the machine to:
accesses, using the second controller, the memory cache associated with the first controller; and
store a copy of the dirty data and a copy of the recovery metadata in a mirror partition of the memory cache associated with the first controller, wherein the mirror partition stores data accessible to the second controller.

16. A computing device comprising:
a memory containing machine readable medium comprising machine executable code having stored thereon instructions for performing a method of transferring ownership of a storage volume; and
a processor coupled to the memory, the processor configured to execute the machine executable code to cause the processor to:
store, using a first controller, data and recovery metadata of a storage volume owned by the first controller in a primary partition of a memory cache of the first controller, and a copy of the data and the recovery metadata in a mirror partition of a memory cache of a second controller that is allocated to the first controller;
receive an indication of an ownership change for the storage volume from the first controller to the second controller;
scan, using the second controller, a mirror partition allocated to the first controller for recovery metadata associated with the storage volume;
generate an active metadata from the scanned recovery metadata, wherein the active metadata manages input/output (I/O) requests for the data stored in the mirror partition; and
use the active metadata to access the data in the mirror partition allocated to the first controller to process an input/output (I/O) request associated with the storage volume using the second controller.

17. The computing device of claim 16, wherein the memory cache of the first controller is a first dynamic random access memory (DRAM) cache comprising the primary partition that stores a first data associated with the first controller and a mirror partition that stores data associated with the second controller, and wherein the memory cache of the second controller is a second DRAM cache comprising a primary partition that stores a second data associated with the second controller and the mirror partition associated with the first controller, and wherein the mirror partition in the second DRAM cache stores a copy of a first data in the primary partition of the first DRAM cache, and wherein the mirror partition in the first DRAM cache stores a copy of a second data in the primary partition of the second DRAM cache.

18. The computing device of claim 16, wherein the data is dirty data associated with the storage volume that has not been flushed to the hard disk drive.

19. The computing device of claim 16, wherein the processor is further configured to execute the machine executable code to cause the processor to:

mark the active metadata with an indication indicating that the active metadata is associated with the data in the mirror partition and data in a primary partition of the memory cache, wherein the data in the mirror partition is associated with the first controller and the data in the primary partition is associated with a second controller.

20. The computing device of claim 16, wherein the second controller is associated with a general storage, and the method further comprises storing the generated active metadata associated with the storage volume in the general storage.

* * * * *